United States Patent [19]

Ference et al.

[11] Patent Number: 4,797,599
[45] Date of Patent: Jan. 10, 1989

[54] POWER CONTROL CIRCUIT WITH PHASE CONTROLLED SIGNAL INPUT

[75] Inventors: Jonathan H. Ference, Kintnersville; Steven M. Blonstein, Allentown; Michael J. Rowen; Robert C. Newman, Jr., both of Emmaus, all of Pa.

[73] Assignee: Lutron Electronics Co., Inc., Coopersburg, Pa.

[21] Appl. No.: 40,618

[22] Filed: Apr. 21, 1987

[51] Int. Cl.[4] .......................................... H05B 41/29
[52] U.S. Cl. ................... 315/194; 315/199; 315/DIG. 4; 315/DIG. 7; 315/294; 315/299; 315/225; 315/226
[58] Field of Search ............... 315/127, 194, 292, 293, 315/311, 298, 318, 307, DIG. 4, 199, 160, 294, 299, 225, 226; 302/303, 310; 361/386, 388; 323/905

[56] References Cited
U.S. PATENT DOCUMENTS

| | | | |
|---|---|---|---|
| 3,697,821 | 10/1972 | Johnson | 315/194 |
| 3,715,623 | 2/1973 | Szabo | 315/194 |
| 3,816,794 | 6/1974 | Snyder | 315/194 |
| 3,894,265 | 7/1975 | Holmes et al. | 315/194 |
| 4,207,498 | 6/1980 | Spira et al. | 315/DIG. 4 |
| 4,225,808 | 9/1980 | Saraceni | 315/194 |
| 4,334,171 | 6/1982 | Parman et al. | 315/DIG. 4 |
| 4,478,468 | 10/1984 | Schoen et al. | 315/DIG. 4 |
| 4,520,295 | 5/1985 | Bolhuis | 315/DIG. 4 |

Primary Examiner—Leo H. Boudreau
Assistant Examiner—Mark R. Powell
Attorney, Agent, or Firm—Ostrolenk, Faber, Gerb & Soffen

[57] ABSTRACT

One or more power dimmers have a preshaped phase controlled input signal connected to their control input. The preshaped phase controlled input signal is generated from the output of a master dimmer having conventional phase control circuits operated from a manual or other control. A relay having contacts in the output circuit of the power dimmers is opened in response to the reduction of the phase controlled input signal to a value less than a given value. In an alternative embodiment, the power dimmers are replaced by an interface circuit which produces a variable frequency, pulse width modulated or other signal.

58 Claims, 5 Drawing Sheets

POWER CONTROL CIRCUIT WITH PHASE CONTROLLED SIGNAL INPUT

BACKGROUND OF THE INVENTION

This invention relates to a novel control circuit for controlling the output power to a load such as a lamp or motor and more specifically relates to a novel phase control circuit in which the input signal is itself a phase controlled signal and in which the power control circuit is positively disconnected from the load circuit in response to the removal of an input signal from the input of the power control circuit.

The invention also relates to a novel interface circuit in which the input signal is a phase controlled signal and the outputs are (1) a variable frequency pulse width modulated,variable voltage or other variable signal and (2) a switched hot output, where the outputs are used to control a high frequency dimming ballast or other power control module, with power being disconnected from the fluorescent dimming ballast via the switched hot output in response to the removal of an input signal from the input of the interface circuit.

Phase control circuits are well known and are commonly used to vary the electrical power applied to a load. For example, phase control circuits are commonly used to control the speed of a motor or the light output of a lighting load. Phase control circuits commonly employ a thyristor such as a silicon controlled rectifier or triac as the switching device. Gate turn off devices, bipolar and MOSFET transistors can also be used. Such devices are hereinafter termed "controllably conductive devices." The gate or control circuit of these devices is constructed with electrical components and operates to cause the controllably conductive device to fire or become conductive at some adjustable time after each zero crossing of the applied power, usually derived from an a-c source. Consequently, voltage is applied to the load in series with the controllably conductive device after a time delay from each zero crossing. The power applied to the load is reduced by an amount related to this phase delay. By varying the time at which voltage is applied to the load, following a zero voltage crossing, one controls the brightness of lights or the speed of a motor, or the like.

Phase control circuits commonly employ an adjustable time delay input circuit, consisting of a resistor and capacitor. The time delay input circuit is then commonly connected to a suitable breakover device such as a diac which becomes conductive when the voltage across the capacitor in the time delay input RC circuit reaches a given value. Upon breakover of the diac, at a controlled time delay after the zero voltage crossing of the input voltage to the time delay circuit, a current is injected into the control lead of the controllably conductive device causing it to become conductive. By making the resistor in the input RC circuit adjustable, one can adjust the time (or phase angle) following a zero crossing of the input voltage that a firing signal is produced to cause the controllably conductive device to become conductive.

It is also common in phase control circuits, particularly those associated with incandescent or fluorescent light dimming, to apply numerous adjustments on the phase angle at which the controllably conductive device is fired in any half cycle. This may be done to compensate for changes in line voltage so that such changes do not affect the output of the circuit; to adjust the "high end trim" (maximum light output) and/or "low end trim" (minimum light output) of the dimmer; to turn on the dimmer (or a motor) with "soft start" in which a dimmer is progressively turned on to a given light intensity by gradually decreasing the phase angle from a maximum value over a given period of time or number of half cycles; or to provide "fade control" so that the light intensity changes at some particular rate when the dimmer control is changed from one value to another, thereby to avoid otherwise annoying rapid changes in light level.

When a large number of dimmers are provided for a dimming system, such as that of the type shown in U.S. Pat. No. 4,575,660, each dimmer of the system may have a full set of signal treating or compensating components. This increases the volume required for the dimmer and further increases the cost of the system. There are also many systems in which a large number of dimmers are to be operated identically but each still requires its full set of adjustment members and controls. Consequently, it is difficult to assemble such dimmers in a small volume and they usually must be assembled in an electrical cabinet which is remote from the respective control members which are usually located conveniently in a wall box mounting. Thus, where high power dimmers, for example dimmers rated at 2,400 or 3,600 watts, are required for a lighting system, it is usually necessary to separate the control devices and the controllably conductive device since the controllably conductive device must be mounted on a relatively large heat sink. Thus, the entire assembly cannot be conveniently located in a wall box along with the manual controls, but must be remotely mounted. By contrast, the entire contents of dimmers rated at up to 2,000 watts can be mounted within a single back box which can in turn be mounted within a suitable wall box.

It is known to have a positive disconnect switch means in series with a voltage control device such as a dimmer where the disconnect is positively open when the dimmer control is operated to a position at which the lights are off or dimmed to a minimum value. The positive disconnect prevents the hazard of working on a load circuit in the mistaken belief that lights dimmed to a minimum are in fact positively disconnected from the power source. Such disconnects commonly are operated when a dimmer control reaches one end of its travel or when a separate toggle is operated. Thus, some positive action is requied of the person operating the dimmer control element, whether a toggle handle or slide handle or the like, in order to obtain the opening of the main disconnect switch. If this is not done but the lights are dimmed to a minimum value, one might be misled to think the disconnect is open.

BRIEF DESCRIPTION OF THE INVENTION

In accordance with one embodiment of the present invention, a novel control circuit is provided for a power control circuit such as a light dimmer wherein the power control circuit has a fixed (nonadjustable) input circuit connected to the control electrode of the controllably conductive device. A control signal which is generated remotely from the power control circuit is applied to the fixed input circuit and has a phase controlled waveform for producing the desired output from the power control circuit. Thus, a waveform having a delayed sharply rising voltage at some given but adjustable instant in an input voltage waveform is directly applied to the control electrode of a controllably conductive device such as a triac, through a fixed input circuit.

Any means desired can be used for generating the phase controlled waveform which is used for controlling the controllably conductive device of the power control circuit. By way of example, a relatively low power phase controlled dimmer or the like can be equipped with conventional phase control circuitry and manual controls therefor to produce a phase controlled output waveform at its main electrodes. This output waveform can then be applied to the fixed input circuit of the power control circuit. The same phase controlled waveform can drive the control electrodes of a plurality of individual power control circuits on the same phase.

Each of the power control circuits receiving the output waveform can, if desired, be of a power rating greater than that of the control signal generator. Consequently, a power amplification or boosting effect is obtained employing the novel invention.

The phase controlled signal generator producing the phase controlled output waveform may also have associated therewith all desired signal conditioning circuits, such as those for producing voltage compensation, high and low end trim or fade control and any other signal conditioning which is desired. The outputs of the plurality of power control circuits will have substantially the same waveform as the output waveform from the phase controlled signal generator. Therefore, their outputs contain the necessary compensations which were built into their input signal.

The phase controlled signal waveform may be produced in a relatively small unit, for example a 600 watt dimmer of the type manufactured under the Trademarks NOVA, SKYLARK or D-600, all of which are sold by Lutron Electronics Co., Inc., the assignee of the present invention. Thus, these standard units will produce a phase shifted output signal into an artificial load to produce the desired waveform having any number of desired voltage waveform compensations. This output waveform is then applied to the fixed input circuits of other dimmers which may be of higher power rating than the small control dimmer and could, for example, be 2,400 or 3,600 watt units.

Alternatively, the phase controlled signal waveform may be obtained by using the output from one of the zones of a multizone wall box dimming system such as that described in copending application Ser. No. 040,646 filed Apr. 21, 1987 which is assigned to the same assignee as the present invention and incorporated herein by reference. This enables one or more loads of a capacity greater than that which the wall box dimming system can alone handle, to be controlled by the wall box dimming system.

As a further feature of the invention, and one which could be employed in any dimmer control circuit, a relay contact is connected in series with the main electrodes of a controllably conductive device. A relay coil for operating this contact is deenergized in response to the reduction of the input signal to the control electrode to a value below some predetermined value. Thus, when the dimmer or voltage control device is, for practical purposes, turned off by being dimmed to a minimum value, the relay coil energization is changed so that its contact opens. The relay preferably has a normally open contact and its coil is made to carry current to cause closure of the contact whenever a gate signal is generated which turns on the controllably conductive device for a minimum period of time in each half-cycle of the input a-c waveform. When the gate signal is present for less than a minimum period of time, the coil is deenergized and the relay contact opens. Preferably, but not necessarily, the input signal for operating a dimmer employing the relay control circuit is a signal having a phase delayed or phase controlled shape, created by a separate phase control signal generator.

In an alternate embodiment of the present invention, a novel interface circuit is provided for a power control module such as a high frequency fluorescent dimming ballast, a mercury vapor lamp dimming system, etc.

The input of the interface circuit is connected to a remotely generated phase controlled waveform. The outputs of the interface circuit are a variable frequency pulse width modulated, variable voltage, or other variable signal as required by the input circuit of the power control module under control; and a switched hot output which either provides source voltage to or removes source voltage from the power control module depending on the phase delay of the phase controlled waveform applied to the input of the interface circuit.

As described above, the phase controlled signal waveform may be produced by using a 600W dimmer such as D-600 (previously referred to) or by using the output from one of the zones of a multizone wall box dimming system. Additionally, the switched hot output can be controlled such that the source voltage is removed from the power control module whenever the phase delay of the remotely generated phase control waveform is such that the input signal to the interface circuit is present for less than a minimum period of time in each half cycle.

DETAILED DESCRIPTION OF THE DRAWINGS

Figure 1:
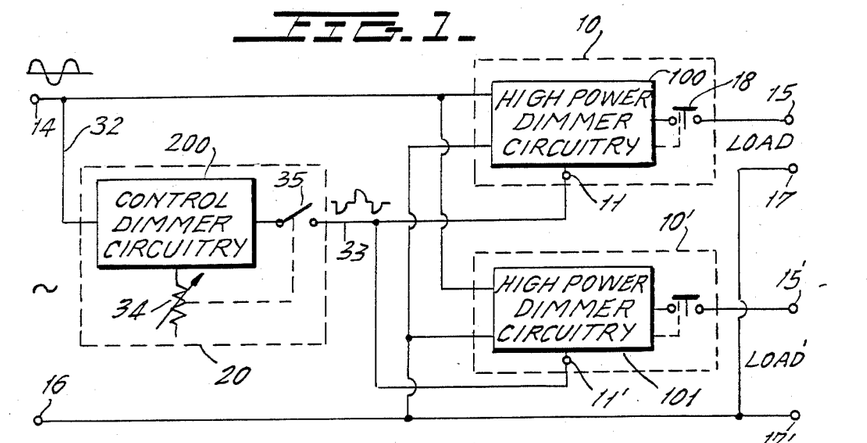
FIG. 1 is a schematic block diagram of a combined high powered dimmer and control dimmer therefor interconnected in accordance with the present invention.

Referring first to FIG. 1, there is shown a block diagram of the circuit and system of the invention shown with reference to a lamp dimming structure. It will be understood that the invention is applicable to any phase control application, including motor speed control, incandescent and gas discharge lamp control and the like.

FIG. 1 illustrates a "high power" dimmer 10 which can be any desired lamp dimmer structure employing a controllably conductive device, for example a triac or silicon controlled rectifiers connected in anti-parallel. The term "high power" refers to dimmers which are rated at about 2000 watts or greater and is not intended to be limiting. It is convenient to term it "high power" since the control dimmer later described may, but need not, have a lower power rating.

Figure 10:
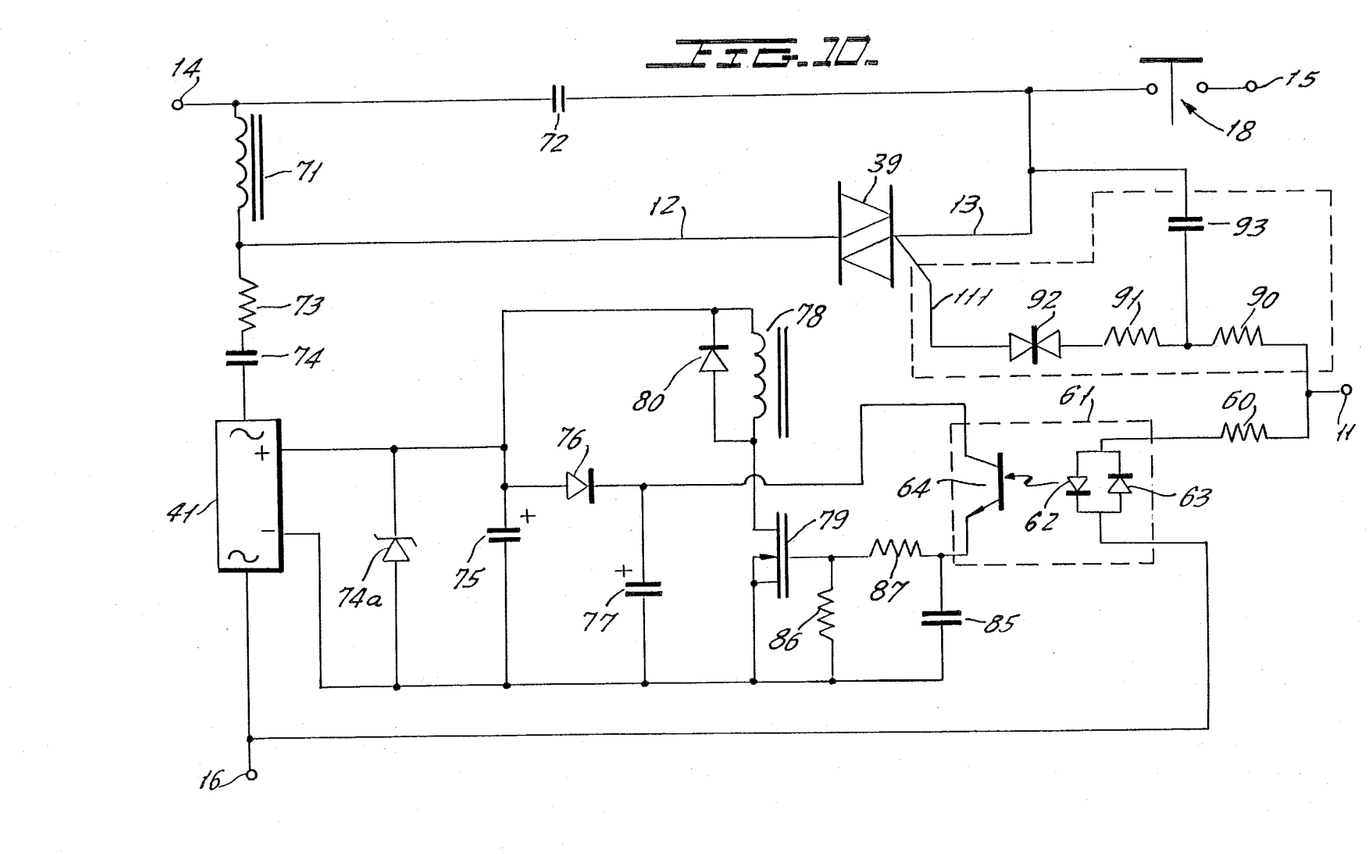
FIG. 10 is a detailed circuit diagram of a preferred embodiment of the circuit of the present invention which is operated from an externally generated input signal having a phase controlled wave shape.

The high power dimmer 10 has an input circuit, 20 which will be shown in more detail with reference to FIG. 10, for enabling the connection of a control signal having a previously shaped phase control wave shape to its control terminal 11. Dimmer 10 is connected in an a-c line which extends from a "hot" a-c terminal 14 to an output load terminal 15 sometimes termed a "dimmed hot" output terminal. An a-c neutral terminal 16 is provided which is shown, for convenience, as connected to the neutral load terminal 17. In practice, usually only the single terminal 16 is available for connection.

A relay contact 18 is connected between load terminal 15 and high power dimmer circuitry 100. As will be later described, when the input signal on the control terminal 11 is lower than some given value, the contact 18 opens, thereby positively disconnecting the load from the hot terminal 14.

Dimmer 10 can be any type of electrical dimmer and can have any power rating. By appropriate selection of the controllably conductive device included in high power dimmer circuitry 100 and its heat sink, dimmer 10 can control loads as high as 3,600 watts. Obviously, higher or lower wattage loads could also be controlled by dimmer 10.

FIG. 1 next shows a control dimmer 20 which generates a phase controlled signal externally of dimmer 10 in order to control dimmer 10 in a phase controlled manner. Thus, the output of the control dimmer 20 applies a phase controlled waveform directly to the control input terminal 11 of the high power dimmer 10. Control dimmer 20 may be any conventional commercially-available dimmer such as the NOVA brand dimmer sold by Lutron Electronics Co., Inc., shown in FIGS. 3 and 4, or the CENTURION brand dimmer shown in FIGS. 5 and 6. These dimmers produce a phase controlled output wave shape at their main power electrodes which is controlled by a conventional internal gate control circuit.

Figure 3:
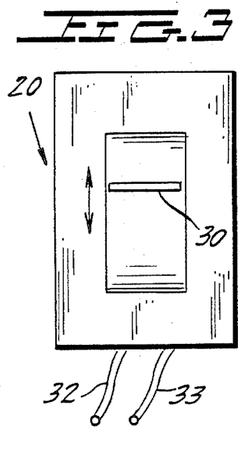
FIG. 3 is a front elevation view of a NOVA brand dimmer product which could be employed as the control dimmer in FIGS. 1 and 2.
Figures 4, 5:
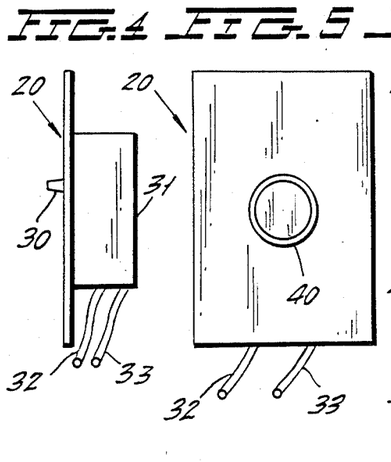
FIG. 4 is a side view of FIG. 3.
FIG. 5 is a front elevation view of a CENTURION brand dimmer product which could be employed as the control dimmer in FIGS. 1 and 2.

Referring to FIGS. 3 and 4, the NOVA brand dimmer is a wall box mounted dimmer having a slide control 30. A back box 31 which fits into a suitable wall box mount, and a pair of a-c power leads 32 and 33. Lead 32 is the hot lead shown in FIG. 1 while lead 33 is the dimmed hot lead of FIG. 1. A load connected between the dimmed hot lead and neutral sees a voltage having a phase delayed wave shape for each half-cycle. The phase delay is adjusted by adjusting slide 30 in FIGS. 3 and 4. Slide 30 operates a linear potentiometer 34 (FIG. 1) contained within back box 31. Vertical motion of the slide 30 changes the delay angle of the firing signal applied to the control electrode of the triac in the control dimmer circuitry 200 of the control dimmer 20. Conventionally, a disconnect contact 35 (FIG. 1) is coupled to the adjustable resistor 34 so that when slide 30 is adjusted such that the dimming level reaches a minimum value, the contact 35 is opened to produce a positive disconnect.

Figure 6:
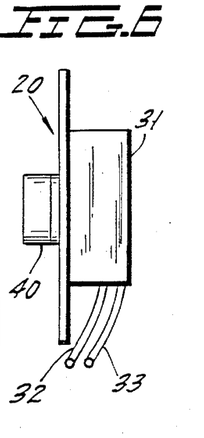
FIG. 6 is a side view of FIG. 5.

The control dimmer 20 can also be the CENTURION brand dimmer, shown in FIGS. 5 and 6 and employing a rotary control 40 in place of the slide control 30 of FIGS. 3 and 4. In all other respects, the control dimmer 20 operates identically for purposes of the present invention, whether it is a slide device, rotary device, touch control device, or momentary contact-actuated device.

It is to be specifically noted that the generation of a control signal is not necessarily dependent upon the use of a commercially available control dimmer. Any electrical synthesizing circuit can be employed to produce a voltage having a phase controlled wave shape which is desired for application to the control input terminal 11 of high power dimmer 10 in order to obtain a particular control on the power applied to the load connected to terminals 15 and 17.

The use of an "externally" generated input phase controlled signal for the input circuit of an existing dimmer is novel. Power dimmers of the prior art have their own variable internal phase delay firing circuit in order to turn on their controllably conductive device with adjustable controlled delay following a zero crossover in any half wave. In accordance with the present invention, this phase controlled signal is created independently of (or remotely of) the high power dimmer being controlled.

Also shown in FIG. 1 in dotted lines is an additional slaved high powered dimmer 10' which is driven from control dimmer 20. This second high power dimmer 10' can be identical to the high power dimmer 10 and can supply energy in a controlled manner to a respective load.

The invention produces considerable simlicity in the structure of the high power dimmer 10 and other slaved units since they can all be controlled from a single exteriorly produced and shaped phase controlled signal on the line 33 of FIG. 1 as will be later described. The high power dimmer 10 is provided with its own safety disconnect switch 18 which automatically opens when the phase controlled signal on line 33 is removed, thus insuring safety to maintenance personnel or others working on the load connected between terminals 15 and 17 in the belief that the load is deenergized when in fact the high power dimmer 10 is dimmed low but is not disconnected from the load. This is described later in more detail.

Figure 2:
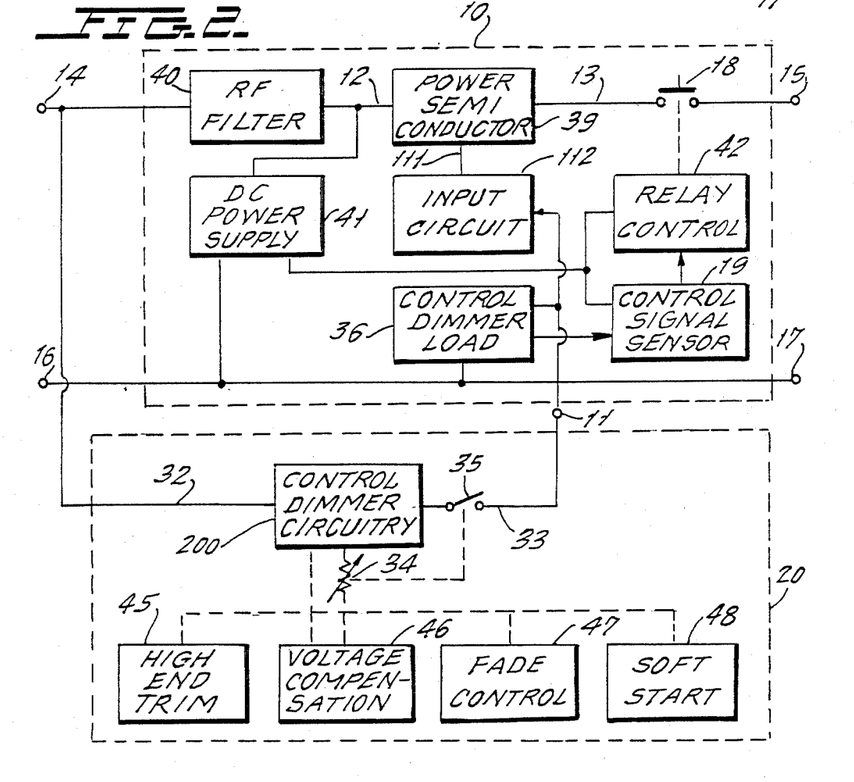
FIG. 2 is a block diagram similar to FIG. 1 with the functional blocks shown in more detail.

The high power dimmer 10 and control dimmer 20 of FIG. 1 are illustrated in more detail in FIG. 2. Components in FIG. 2 which are identical to those in FIG. 1 have the same identifying numeral. A power semiconductor 39 is shown in FIG. 2 as a device such as a triac having power leads 12 and 13 connected to its main power electrodes and lead 111 connected to its gate electrode.

The high power dimmer 10 of FIG. 2 contains an RF filter 40, and a d-c power supply 41. Power supply 41 provides the d-c supply for control signal sensor 19 and relay control circuit 42. Control signal sensor 19 is coupled to relay control circuit 42 which contains a rela coil control circuit for energizing and deenergizing the relay coil which operates the relay contacts 18. It will be noted that relay contacts 18 may be of any variety, but preferably are normally open contacts which are held closed only when the relay coil is energized, which occurs only when there is an output signal from the control signal sensor 19.

High power dimmer 10 further includes control dimmer load 36 and input circuit 112. Control dimmer load 36 provides a load for control dimmer 20 and also provides an isolated input for control signal sensor 19. When the input signal applied to input terminal 11 is lower than some given value, this is reflected in the signal applied to control signal sensor 19. Control signal sensor 19 detects this and signals relay control circuit 42 to deenergize the relay coil (not shown), thus opening relay contacts 18.

Input circuit 112 conditions the phase control signal applied at input terminal 11 as will be described in more detail later, with reference to FIG. 10.

Control dimmer 20 in FIG. 2 contains various signal shaping or signal control circuits for adjusting or modifying the phase controlled output signal generated thereby. Thus, as schematically shown in FIG. 2, high end trim circuits 45, voltage compensation circuits 46, fade control circuits 47 and soft start circuits 48 can all be contained within the control dimmer 20. Since it is a relatively low power dimmer, all of the shaping and control circuitry can be contained within the conventional back box 31 of FIGS. 4 and 6.

Figure 7:
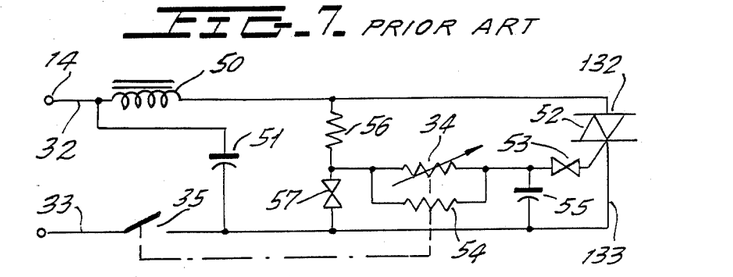
FIG. 7 is a circuit diagram of any of the dimmers of FIGS. 3–6.

A typical circuit for the control dimmer 20 is shown in FIG. 7. Components similar to those of the preceding figures have the same identifying numerals. Lines 32 and 33 are the main power lines with the disconnect switch 35 connected in the line 33. The circuit contains an RF filter consisting of choke 50 and capacitor 51. The main controllably conductive device of the control dimmer 20 consists of triac 52. The triac 52 has a pair of main terminals 132 and 133 and a control terminal. A control circuit is connected to the triac control terminal and contains a relatively low voltaqe breakover device shown as the diac 53. A time delay circuit consisting of adjustable resistor 34, a parallel connected fixed resistor 54 and capacitor 55 are provided in the usual fashion. A voltage divider consisting of resistor 56 and high voltage diac 57 couple an input voltage to the time delay circuit. Resistor 54 is selected to accomplish a desired low end trim function.

The circuit operates such that adjustable resistor 34 and capacitor 55 form a variable time delay circuit for providing a voltage across the circuit including diac 53 and the gate and main lead 133 of the triac 52. Once this voltage has risen to the breakover voltage of the diac 53, diac 53 conducts and the triac 52 fires. The time at which the firing of triac 52 occurs in any half-cycle is controlled by varying the adjustable resistor 34 which sets the amount of phase delay or firing angle of the circuit.

In accordance with the invention, the dimmed hot output lead 33 is connected to a loading resistor 60 in high power dimmer 10 as shown in FIG. 10, which is sized to dissipate power greater than the minimum wattage required by control dimmer 20. The loading resistor 60 corresponds to the control dimmer load 36 of FIG. 2. The phase controlled voltage across resistor 60 represents an externally and remotely produced phase controlled signal applied to the input of a high power phase control-operated power circuit. If the control dimmer has a constant gate drive, loading resistor 60 may be a 2 watt resistor, having a value of about 15,000 ohms. In those circumstances where the control dimmer requires a minimum load of about 35 watts or more, an electronic load may be used instead of loading resistor 60 to reduce power dissipation as is described in more detail hereinafter.

Figure 8:
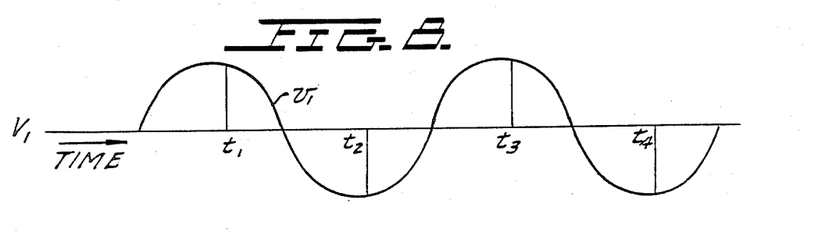
FIG. 8 shows the voltage waveform of the input voltage wave shape for the dimmers of FIGS. 3–7.

FIG. 8 shows the voltage waveform $V_1$ of the a-c voltage applied between terminals 14 and 16. In order to generate the desired phase controlled output signal from control dimmer 20, potentiometer 34 is set at a value to cause the triac 52 to conduct at a predetermined phase delay following a zero voltage crossing of the voltage $V_1$ in FIG. 8 and at times t1, t2, t3 and t4 in the four half-cycles shown in FIG. 8. As a result of this control, the voltage appearing across resistor 60 in high power dimmer 10 will have the phase controlled shape characteristically shown in FIG. 9. The phase controlled signal has a sharply rising waveform beginning at some time following the zero crossing of the waveform and then reducing generally sinusoidally to zero.

Figure 9:
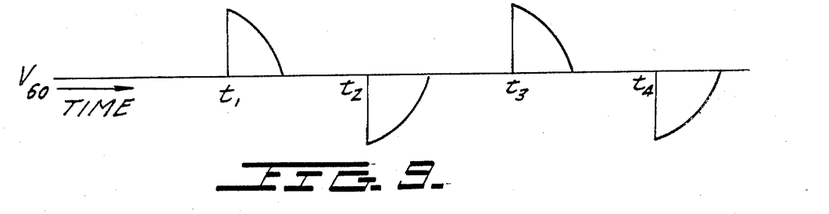
FIG. 9 is a diagram of the phase controlled output wave shape produced by the dimmers of FIGS. 3–7.

In accordance with the invention, a circuit such as that of FIG. 7 is employed to produce this output voltage wave shape which is applied to the control input terminal 11 of the high power dimmer 10 in FIGS. and 2 in order to cause it to apply an output voltage to another load with a voltage wave shape closely approximating that of the phase controlled input signal of FIG. 9.

FIG. 10 shows a preferred embodiment of the circuit for the high power dimmer 10 of the preceding figures. Components similar to those of FIGS. 1 and 2 have been given the same identifying numerals.

The RF filter 40 of FIG. 2 is shown in FIG. 10 as the inductor 71 and capacitor 72. Inductor 71 may have an inductance of 50 microhenries and capacitor 72 may have a capacitance of 0.047 microfarads. A first terminal of coil 71 is connected in series with the triac 39 which may be a type MAC 223-5 triac made by Motorola semiconductors. A one ampere, 600 volt, single phase, full wave bridge rectifier 141 is connected to the neutral terminal 16, and to the first terminal of inductor 71 through the series connection of capacitor 74 (1.1 microfarads) and resistor 73 (180 ohms). A Zener diode 74a is connected across the d-c output of power supply bridge 141 and may be a 24 volt Zener diode which acts as a clamp. Resistor 73, capacitor 74, bridge 141 and Zener 74a serve the function of an RC dropping network and shunt regulator. The power supply output voltage which drives the relay coil associated with contacts 18 and the input signal sensing circuitry to be described, is smoothed into a relatively unfluctuating d-c by capacitor 75 (22 microfarads).

A diode 76 and capacitor 77 (22 microfarad) act, with capacitor 75, as a filter. Relay coil 78 which is coupled to contact 18 (a normally open contact) is in series with a power MOSFET 79 which may be an International Rectifier type IRF113 device. A protective diode 80 is connected in parallel with the coil 78. When power MOSFET 79 is turned on, current is conducted by relay coil 78 so that the normally open contact 18 will be closed.

An optocoupler 61 consists of two light emitting diodes 62 and 63 and photosensitive transistor 64. Optocoupler 61 may be of the commercial type H11AA1 manufactured by General Electric.

Light emitting diodes 62 and 63 in optocoupler 61 are connected between neutral terminal 16 and one terminal of resistor 60. The other terminal of resistor 60 being connected to input terminal 11.

The control circuit for controlling the gate to source voltage of power MOSFET 79 includes the capacitor 85 (0.1 microfarad) connected in series with the collector-emitter circuit of transistor 64 in the optocoupler 61. Resistors 86 (100K) and 87 (220K) form a voltage divider to protect the gate of the MOSFET 79 and to discharge capacitor 85 when a dimmed signal output is no longer present or is insufficient to produce a sufficient output from LEDs 62 and 63 sufficient to render transistor 64 conductive.

In operation, so long as a periodic signal appears on the input terminal 11 (in the form of a phase controlled signal), transistor 64 will be periodically turned on to enable charging of capacitor 85 from the power supply previously described. Capacitor 85 discharges between conduction periods of transistor 64 but, so long as a sufficient signal is present at which contact 18 should remain closed, capacitor 85 will generate a suitable gate voltage to maintain MOSFET 79 in conduction. So long as the MOSFET 79 conducts, the relay coil 78 is energized and the contact 18 is held closed.

When the signal applied to terminal 11 falls below a certain value, either by adjusting adjustable resistor 34 in control dimmer 20 to a very low dimmer setting or by opening switch 35 in control dimmer 20, light emitting diodes 62 and 63 no longer emit sufficient light to enable phototransistor 64 to conduct.

Capacitor 85 then discharges through resistors 87 and 86 and MOSFET 79 is gated off, deenergizing relay coil 78 and opening contacts 18, hence providing an air gap disconnection of the load from dimmer 10.

The triac 39 of FIG. 10 is provided with an input circuit which contains no adjustment members although trim parts which are not used ordinarily to adust the circuit during its normal operation or use may be present. However, full adjustment capability can be provided at dimmer 10, to be used alternatively to the remotely generated phase controlled signal from dimmer 20. Thus, in the preferred embodiment, the input circuit 112 is not an adjustable dimming input circuit since dimming control is obtained from the wave shape of the signal applied to input terminal 11.

The input circuit 112 consists of resistor 90 (270 ohms) and a positive temperature coefficient resistor 91 (22 ohms) which provides miswire protection, connected in series with diac 92 (type V-413 manufactured by Nippon Electric Company). Diac 92 is, in turn, connected to the gate lead 111. A capacitor 93 (0.22 microfarads) is connected as shown. Diac 92 and capacitor 93 reduce false firing of the triac 39. Note that no signal conditioning or adjustment circuitry is employed in the input circuit to triac 39 since these functions can be carried out in the conditioning of the signal applied to input terminal 11 in FIG. 10.

The unit disclosed in FIG. 10 will enable a single master dimmer (the control dimmer 20 of the preceding figures) to drive more than its rated load. That is, the dimmer 20 may be rated at 600 watts while the dimmer being driven might be rated at 3,600 watts. The high power dimmer of FIG. 10 uses the dimmed hot output of the master or control dimmer as its input signal and creates a phase control voltage waveform that can be sent to additional loads on the same phase as the master dimmer or control dimmer, as was shown in FIG. 1.

This then allows a single master or control dimmer to control unlimited amounts of load so long as all loads are on the same phase. This operation can be thought of as a phase control amplifier. Thus, the high power unit will exactly duplicate the phase control signal of the master or control dimmer, including all voltage or soft start compensation. Moreover, the high power unit provides an air gap switch that will open when there is no input signal and close automatically when a phase control input signal is applied to the unit.

The novel power booster arrangement of the present invention can be applied to line voltage or low voltage loads and also standard fluorescent dimming system loads by appropriate adjustments to the power circuitry of high power dimmer 10 as is well known in the art. Similarly, the novel invention can be applied to any generalized voltage control process.

Figure 11:
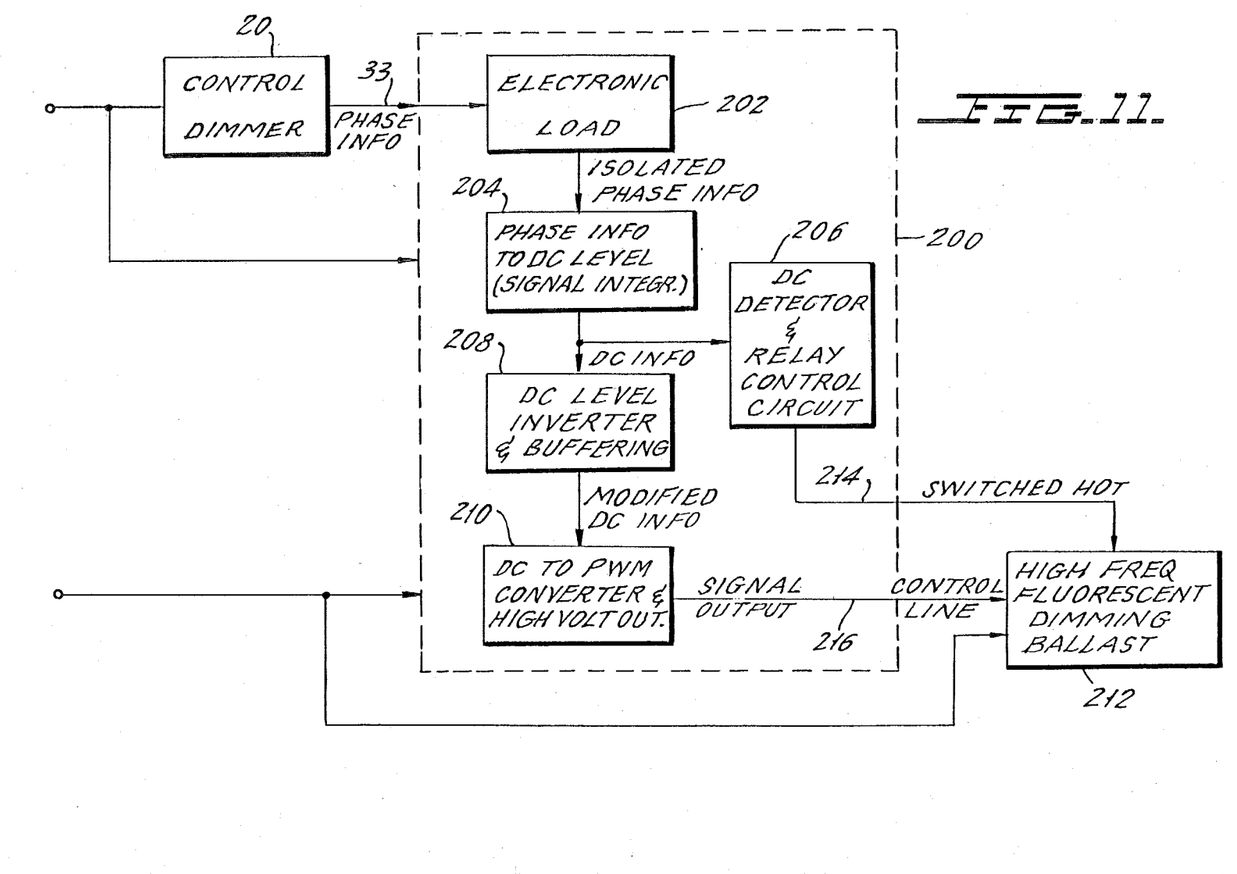
FIG. 11 is a schematic block diagram of a combined interface circuit and control dimmer therefor interconnected in accordance with an alternative embodiment of the present invention.

An alternative embodiment of the invention is illustrated in FIG. 11. An interface circuit 200 has as its control input the phase control signal present on line 33 from control dimmer 20. The outputs from interface circuit 200 are a switched hot output 214 and a control output 216. These can be used to control a high frequency electronic dimming ballast 212 such as the HiLume OSPCU series sold by the assignee of the present invention and described in U.S. patent application Ser. No. 642,072, filed Aug. 17, 1984.

Control dimmer 20 operates as described above to produce a phase controlled output on line 33 from the voltage available at "hot" a-c terminal 14.

Interface circuit 200 is connected to "hot" a-c terminal 14 and "neutral" d-c terminal 16, the voltage between these two terminal providing the power source for the interface circuit. Output line 33 of control dimmer 20 is connected to an electronic load 202 within interface circuit 200. Electronic load 202 properly loads control dimmer 20 and provides a means for detecting the phase information in the phase controlled output from control dimmer 20 and electrically isolating it from the a-c line voltage so it can be utilized in the remaining circuitry of interface circuit 200. These functions are accomplished with very little power dissipation.

The isolated phase control information from electronic load 202 is supplied to "phase information to DC level circuit" 204 which converts the varying phase angle to a varying d-c voltage. This d-c voltage is the input to inverter and buffer circuit 208 and relay control circuit 206.

Inverter and buffer circuit 208 conditions the d-c voltage generated by circuit 204 as will be described in more detail below. Relay control circuit 06 detects the presence or absence of a d-c voltage at its input and closes or opens a relay, respectively. One terminal of the relay is connected to "hot" a-c terminal 14 and the other is connected to switched hot lead 214 which provides a-c voltage to dimming ballast 12.

The conditioned output from inverter and buffer circuit 208 is the input to d-c to pulse width modulated signal circuit 210. Circuit 210 produces the pulse width modulated signal required by high frequency fluorescent dimming ballast load 212 from the conditioned d-c signal input.

Hence, the phase controlled output from any dimmer can be used to control the light output of high frequency electronic dimming ballasts. This feature is particularly useful when the phase controlled output used is from one zone of a multizone wall box dimming system.

By making appropriate changes to the circuitry in interface circuit 200, the outut could be a variable voltage, variable frequency or other signal as required by the power control module to be controlled.

Figure 12:
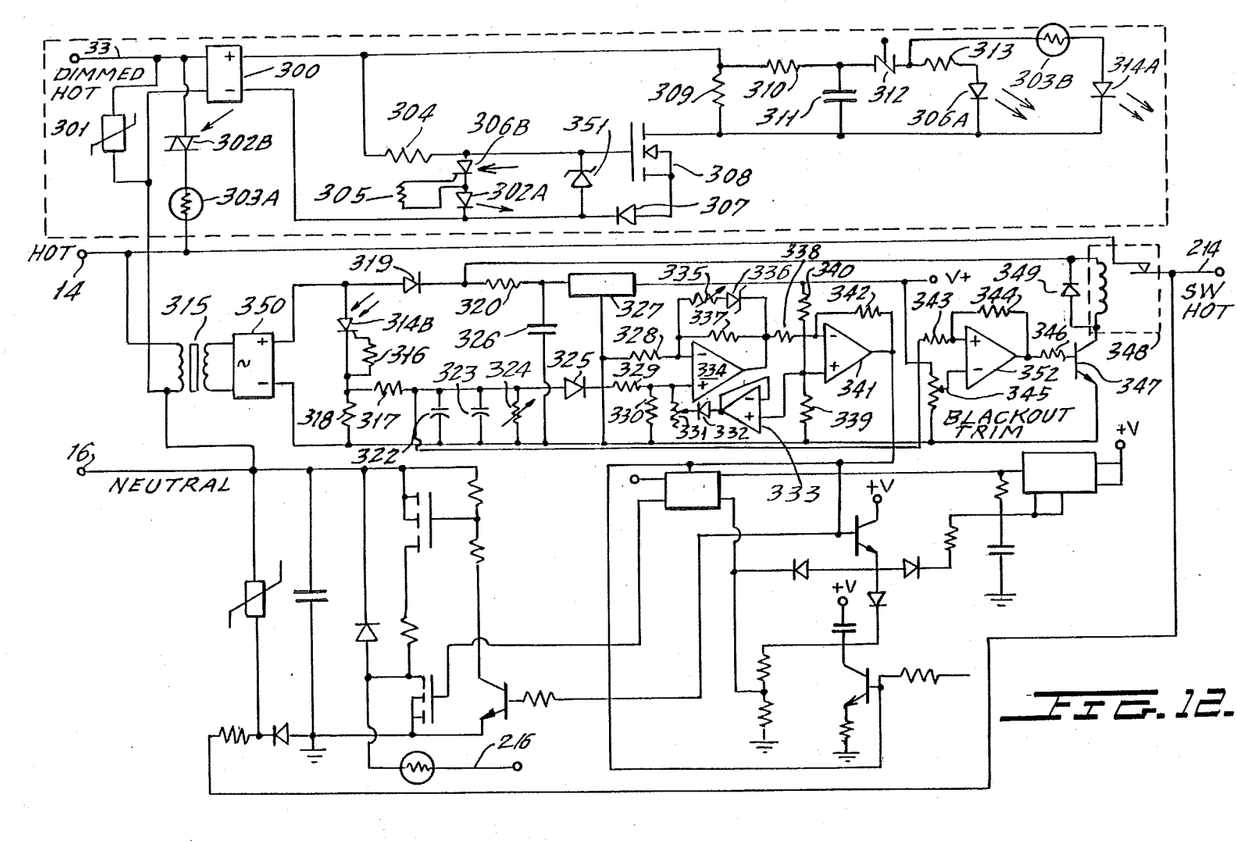
FIG. 12 is a detailed circuit diagram of a circuit employing the features of the block diagram of FIG. 11.

FIG. 12 is a detailed circuit diagram of the interface circuit 200 illustrated in FIG. 11. Dimmed hot line 33 from control dimmer 20 is connected to an a-c terminal of bridge rectifier 300, the other a-c terminal of bridge rectifier 300 being connected to neutral terminal 16. Metal oxide varistor 301 provides protection against surge voltages or noise spikes which may occur on line 33.

The rectified leakage current flowing from the d-c output terminals of bridge rectifier 300 prior to the triac in control dimmer 20 being gated on, flows through resistor 304 and Zener diode 351. When the triac in control dimmer 20 is gated on, line voltage appears on line 33. FET 308 is gated on and the load current from control dimmer 20 flows through bridge rectifier 300, resistor 309, FET 308 and diode 307. Sufficient voltage is generated across resistor 309 to charge up capacitor 311 through resistor 310. Once capacitor 311 charges up to the breakover voltage of silicon bilateral switch (SBS) 312, SBS 312 begins to conduct, and a pulse of current flows through resistor 313 into LED 306A of an optocoupler and through positive temperature coefficient (PTC) resistor 303B into LED 314A of another optocoupler.

The pulse of current flowing through LED 306A causes light triggered SCR 306B to be triggered on. Load current now flows through resistor 304, a light triggered SCR 306B and LED 302A of another optocoupler. FET 308 is gated off. Since resistor 304 (18 Kohms) has a much greater value than resistor 309 (100 ohms), the value of the load current flowing is substantially reduced. Optotriac 302B is gated on due to the current flowing in LED 302A. This connects dimmed hot line 33 to hot terminal 14 through PTC resistor 303A and the triac in control dimmer 20 turns off. Resistor 305 is the gate resistor for opto SCR 306B.

PTC resistors 303A and 303B are thermally coupled together and provide miswire protection for interface circuit 200. The circuitry described above comprises electronic load 202.

The power supply for the remainder of the control circuitry is provided in a conventional manner by transformer 315, bridge rectifier 350, diode 319, resistor 320, capacitor 26 and voltage regulator 327.

Light triggered SCR 314B is gated on in response to a pulse of light from LED 314A when a pulse of current flows through LED 314A as described above. Current then flows through resistor 318. Resistor 316 is the gate resistor for light triggered SCR 314B The voltage across resistor 318 is a rectified phase controlled sine wave with the same phase delay as the voltage on line 33.

The voltage across resistor 318 is the input to a two pole low pass filter comprised of resistors 317, 321 and 324 and capacitors 322 and 323. The output of this filter is a smoothed d-c voltage whose voltage is related to the phase delay of the voltage across resistor 318.

Resistors 328, 329, 330 and 337; variable resistor 335 and Zener diode 336, together with op amp 334, provides a gain stage with a breakpoint in the gain, whereby the gain is reduced at higher input voltages.

The smoothed d-c voltage from the previous stage is applied to the gain stage via diode 325.

Op amp 333 together with diode 332 and variable resistor 331 provides an adjustable low end trim. As described above, this could also be incorporated into control dimmer 20.

Resistors 339, 340 and 342 and op amp 341 provide an inverting stage such that a large d-c voltage results in low light levels and vice versa as required by the next stage of the control circuitry. The output from op amp 341 is applied to the d-c to pulse width modulated waveform converter which has a high voltage output This converter utilizes the same circuitry that is used in the model NTHF-40 wall box control as sold by Lutron Electronics Co., Inc., the assignee of the present invention, and has a high voltage pulse width modulated output suitable for controlling HiLume OSPCU series high frequency fluorescent dimming ballasts.

A d-c detector and relay control circuit is provided by resistors 343, 344 and 346; variable resistor 345; op amp 352 and transistor 347. The d-c voltage across resistor 318 is applied to the positive input of op amp 352. When this voltage is above a value set by variable resistor 345, the output of op amp 352 goes high biasing transistor 347 on. This causes current to flow in the relay coil of relay 348 closing the contacts of relay 348 and connecting switched hot terminal 314 to hot terminal 14. Diode 349 provides flyback protection for the coil of relay 348. When the d-c voltage detected falls below the preset value, relay 348 opens providing a positive off for the ballasts being controlled.

The presently preferred values of the resistors and capacitors of the embodiment of FIG. 12 are set forth in Table I below. All resistors are 0.5 W power rating unless otherwise stated.

TABLE I

| Resistor | Value (Ohms) | Resistor | Value (Ohms) | Capacitor | Value (uF) |
|---|---|---|---|---|---|
| 304 | 18k (4 W) | 330 | 18k | 311 | 0.1 |
| 305 | 10k | 331 | 1 M (Variable) | 322 | 4.7 |
| 309 | 100 (2 W) | 335 | 10k (Variable) | 323 | 4.7 |
| 310 | 3.3k | 337 | 34k | 326 | 100 |
| 313 | 30 | 338 | 68k | | |
| 316 | 10k | 339 | 33k | | |
| 317 | 10k | 340 | 66k | | |
| 318 | 10k | 342 | 68k | | |
| 320 | 10 (1 W) | 343 | 15k | | |
| 321 | 10k | 344 | 3 M | | |
| 324 | 68k | 345 | 10k (Variable) | | |
| 328 | 47k | 346 | 10k | | |
| 329 | 18k | | | | |

Diodes 307, 319 and 349 are type IN4004. Diodes 325 and 332 are type IN914. Bridges 300 and 350 are 1A, 600V bridges. SBS312 has a breakover voltage of 7.5V. Zener diode 336 has a zener voltage of 2.4V, and zener diode 351 has a zener voltage of 7.5V. Transistor 308 is a MTP2N40 Field Effect Transistor. Transistor 347 is a 2N4123. Regulator 327 is an LM340T12. LED 302A and optotriac 302B form an IL420 optocoupler. LED 306A and opto SCR306B form one H11C4 optocoupler, and LED 314A and opto SCR314B form a second H11C4 optocoupler. Op Amps 333, 334, 341 and 352 together form a LM324 integrated circuit. MOV 301 has a voltage rating of 150V. 303A is a 150 ohm PTC, 303B is a 100 ohm PTC. 315 is a 120:24V transformer. Relay 348 has a 24 V coil and contacts rated at 20A.

Interface circuit 200 has been described in connection with a circuit which produces a pulse width modulated high voltage output. However, the output could also be a varying voltage, varying frequency or other output as required by the power module to be controlled.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A phase control circuit comprising, in combination:
   a controllably conductive device having first and second main electrodes connectable in series with an a-c source and a load, and a control electrode;
   an input circuit connected between said control electrode and one of said first and second main electrodes; and
   a control signal source separate from said input circuit and connected to said input circuit, said control signal source generating a periodic phase controlled voltage wave shape in which each half-cycle has a sharply rising wave shape beginning at a delayed time in its respective period, and thereafter follows a generally sinusoidal shape to the end of its respective period; whereby said controllably conductive device conducts to produce an output voltage wave shape across said load with a phase delay which is derived from the wave shape of said control signal source.

2. The combination of claim 1, wherein said input circuit contains a breakover device.

3. The combination of claim 1, wherein said control signal source comprises a second controllably conductive device having second first and second main electrodes, a second control electrode and a control circuit connected between said second control electrode and one of said second first and second main electrodes; said second, controllably conductive device being connected in series with said input circuit.

4. The combination of claim 1, wherein said control signal source is derived from said a-c voltage source.

5. The combination of claim 1, wherein said control signal source is physically remote from said controllably conductive device.

6. The combination of claim 1, wherein said controllably conductive device is a triac.

7. The combination of claim 3, which further includes manually-operable control means connected to said control circuit for producing a variable phase delay in each half-cycle of the voltage waveshape across said load.

8. The combination of claim 7, wherein said input circuit contains a fixed resistor/capacitor circuit.

9. The combination of claim 1, which further includes signal modification circuits connected to said control signal source for modifying the voltage waveshape produced thereby in a predetermined manner, whereby the output voltage waveshape across said load will contain equivalent modifications.

10. The combination of claim 3, which further includes signal modification circuits connected to said control signal source for modifying the signal produced thereby in a predetermined manner, whereby the output voltage waveshape across said load will contain equivalent modifications.

11. The combination of claim 7, which further includes signal modification circuits connected to said control signal source for modifying the signal produced thereby in a predetermined manner, whereby the output voltage waveshape across said load will contain equivalent modifications.

12. The combination of claim 8, which further includes signal modification circuits connected to said control signal source for modifying the signal produced thereby in a predetermined manner, whereby the output voltage waveshape across said load will contain equivalent modifications.

13. The combination of claim 3, which further includes a fixed resistive load connected in series with said second controllably conductive device.

14. The combination of claim 7, which further includes a fixed resistive load connected in series with said second controllably conductive device.

15. The combination of claim 8, which further includes a fixed resistive load connected in series with said second controllably conductive device.

16. The combination of claim 13, wherein said fixed resistive load is a 2 watt resistor.

17. The combination of claim 15, wherein said fixed resistive load is a 2 watt resistor.

18. In combination, a high power phase controlled dimmer and a low power phase controlled dimmer; said high power dimmer having first and second main electrodes and a control electrode for controlling the output of said high power dimmer in response to an input signal applied to said control electrode; said low power dimmer having first and second main electrodes and a control electrode and variable phase control circuit means connected to said low power dimmer control electrode for controlling the output voltage of said low power dimmer to produce a phase controlled output voltage waveform; one of said first and second main electrodes of said low power dimmer being connected to said control electrode of said high power dimmer, whereby the output voltage of said high power dimmer has a phase controlled output voltage waveform corresponding to that of the output voltage waveform of said low power dimmer, which provides the input signal to said control electrode of said high power dimmer.

19. The combination of claim 18, wherein said low power dimmer is connected in series with a fixed resistive load in said high power dimmer and a source of a-c voltage.

20. The combination of claim 19, wherein said high power dimmer is connected in series with a lighting load, and said source of a-c voltage.

21. A dimmer for control of electrical loads, said dimmer comprising a controllably conductive device having a pair of main electrodes and a control electrode; an input circuit connected to said control electrode for applying an externally generated variable control signal to said control electrode for varying the output voltage from an electrical source which is applied through said dimmer to said load; a relay having a relay coil and a relay contact, said relay contact connected in series with said pair of main electrodes; a relay control circuit having an input electrode and operable in response to the application of said externally generated variable control signal to its said input electrode; said relay control circuit connected to said relay coil, to open and close said relay contact; whereby the reduction of said externally generated variable control signal below some given value will cause the opening of said relay contact.

22. The dimmer of claim 21, wherein said dimmer has an input terminal and an output terminal which are connectable in series with a source of a-c power and an electrical load; said input terminal, first and second main electrodes, relay contact and output terminal being connected in series.

23. The dimmer of claim 21, which further includes d-c power supply circuit means to provide power to said relay coil and said relay control circuit.

24. The dimmer of claim 22, which further includes d-c power supply circuit means to provide power to said relay coil and said relay control circuit.

25. The dimmer of claim 24 wherein said d-c power supply circuit means is connected to and energized by said source of a-c power.

26. The dimmer of claim 21, wherein said externally generated variable control signal is produced by an auxiliary phase controlled dimmer.

27. The dimmer of claim 22, wherein said externally generated variable control signal is produced by an auxiliary phase controlled dimmer.

28. The dimmer of claim 25, wherein said externally generated variable control signal is produced by an auxiliary phase controlled dimmer.

29. In combination, a first dimmer, a second phase controlled dimmer and an interface circuit; said first dimmer having first and second main terminals and control terminals for controlling the output of said first dimmer in response to control input signals applied to said control terminals; said second dimmer having first and second main terminals and a control electrode and variable phase control circuit means connected to said second dimmer control electrode for controlling the output voltage of said first and second main terminals of said second dimmer to produce a phase controlled waveform; said interface circuit havinq an input terminal, output terminals and siqnal conversion circuit means for converting a phase controlled input signal connected to its said input terminal to control signals adapted to control said first dimmer at its said output terminals; one of said first and second main electrodes of said second dimmer connected to said input terminal of said interface circuit; said output terminals of said interface circuit connected to said control terminals of said first dimmer, whereby the output voltage waveform of said first and second main electrodes of said first dimmer has an output related to the control information contained in said phase controlled waveform at said first and second main electrodes of said second dimmer.

30. The combination of claim 29, wherein said first dimmer is controlled by a pulse width modulated waveform signal; said interface circuit converting said phase controlled waveform of said second dimmer to a related pulse width modulated input for said first dimmer.

31. The combination of claim 29, wherein said first dimmer is a high frequency fluorescent dimming ballast.

32. The combination of claim 29, wherein said first dimmer is adapted for dimming of mercury vapor lamps.

33. The combination of claim 29, wherein said first dimmer is controlled by a signal having a variable voltage; said interface circuit converting said phase controlled waveform of said second dimmer to a related voltage for controlling said first dimmer.

34. The combination of claim 29, wherein said first dimmer is controlled by a signal having a variable frequency; said interface circuit converting said phase controlled waveform of said second dimmer to a related signal frequency input for said first dimmer.

35. The combination of claim 29, which futher includes disconnect means coupled to said first dimmer and operable to effectively prevent current conduction between said first and second main terminals of said first dimmer; and operating means for said disconnect means; said operating means connected to said second dimmer and becoming operable in response to a predetermined output condition of said second dimmer.

36. The combination of claim 29, which further includes electronic load means in said interface circuit coupled to said phase controlled waveform of said second dimmer.

37. The combination of claim 36, wherein said electronic load provides a load for said second dimmer and contains phase delay detection circuit means for detecting the phase delay of said phase controlled waveform, said interface circuit further including d-c level generating circuit means connected to said phase delay detection circuit means for generating a d-c output signal which is related to the amount of phase delay in said phase controlled waveform and circuit means for coupling a signal related to said d-c output signal to said control terminals of said first dimmer.

38. The combination of claim 37, which further includes signal processing means for converting said d-c output signal to a signal having the input characteristic needed to control said first dimmer.

39. The ocmbination of claim 37, which further includes disconnect means coupled to said first dimmer and operable to effectively prevent current conduction between said first and second main terminals of said first dimmer; and operating emasn for said disconnect means; said operating means connected to said interface circuit and becoming operable in response to a predetermined output condition of said interface circuit.

40. The combination of claim 38, which further includes disconnect means coupled to said first dimmer and operable to effectively prevent current conduction between said first and second main terminals of said first dimmer; and operating means for said disconnect means; said operating emans connected to said interface circuit and becoming operable in response to a predetermined output condition of said interface circuit.

41. The combination of claim 39, wherein said operating means for said disconnect means is coupled to said d-c output signal of said phase delay detection circuit means.

42. An electronic load for a phase controlled dimmer, said electornic load comprising:
first and second imput terminals for receiving from a phase control circuit a periodic phase control voltage wave shape output having in each half-cycle a sharply rising wave shape beginning at a delayed time in its respective period;
a series combination of a first switch means and a low impedance load for the phase control circuit, said series combination being coupled across said first and second input terminals, and means for maintaining said first switch means closed from about the beginning of each half-cycle to at least beyond the occurence of said sharply rising wave shape; and
control means for sensing the occurrence of said sharply rising wave shape and for opening said first switch means after the occurrence thereof.

43. The electronic load of claim 42, wherein said phase control circuit is a phase controlled dimmer and said output comprises a phase controlled voltage waveform supplied by said dimmer.

44. The electronic load of claim 42, further including signal generating means for generating a control signal at about the occurrence of said sharply rising wave shape.

45. The electronic load of claim 44, further including signal conversion means for converting said control signal into an input signal for a second dimmer, on the basis of phase information contained in said control signal.

46. The electronic load of claim 43, further including a third input terminal, second switch means for connecting one of said first and second input terminals and said third input terminal and means for closing said second switch means when said first switch means is open and opening said second switch means when said first switch means is closed.

47. The electronic load of claim 46, wherein said phase controlled voltage waveform is derived from a source voltage, said source voltage being applied between said third input terminal and that one of said first and second input terminals which is not coupled to said second switch means.

48. An electronic load for a phase controlled dimmer, said electronic load comprising:
first and second input terminals for receiving from a phase control circuit a periodic phase control voltage wave shape output having in each half-cycle a sharply rising wave shape beginning at a delayed time in its respective period;
a first series combination of a first switch means and a low impedance load for the phase control circuit, said first series combination being coupled across said first and second input terminals, said first switch means being closed from about the beginning of each half-cycle and remaining closed at least beyond the occurrence of said sharply rising wave shape;
a second series combination of a high impedance load and a second switch means, said second series combination being coupled across said first and second input terminals;
means for sensing the occurrence of said sharply rising wave shaped and for opening said first switch means in response to said occurrence; and
second means for closing said second switch means when said first switch means is opened and, vice versa, opening said second switch means when said first switch means is closed.

49. The electronic load of claim 48, wherein said phase control circuit is a phase controlled dimmer and said output comprises a phase controlled voltage waveform supplied by said dimmer.

50. The electronic load of claim 48, further including signal generating means for generating a control signal at about said occurrence of said sharply rising wave shape.

51. The electronic load of claim 48, wherein said first switch means comprises a field effect transistor.

52. The electronic load of claim 48, wherein said second switch means comprises a light-triggered SCR.

53. The electronic load of claim 49, further including a third input terminal, third switch means for connecting one of said first and second input terminals to said third input terminal.

54. The electronic load of claim 53, wherein said phase controlled voltage waveform is derived from a source voltage, said source voltage being applied between said third input terminal and that one of said first and second input terminals which is not coupled to said third switch means.

55. A combination comprising:
a first dimmer having a first output for controlling a load, said first dimmer having a control electrode for controlling said output of said first dimmer;
a second, phase controlled dimmer for controlling the first dimmer, the second dimmer including a respective control electrode and a phase control circuit connected to said respective control electrode for controlling a respective output voltage of said second dimmer, said respective output voltage having a voltage wave shape which includes a sharp rise in each half-cycle beginning at a delayed time in its respective period; and
an electronic load including a dimmer load for said second dimmer and disconnecting means for selectively disconnecting said dimmer load from said second dimmer.

56. The combination of claim 55, further including control means for sensing the occurrence of said sharp rise and for actuating said first dimmer upon the occurrence of said sharp rise.

57. The combination of claim 56, in which said control means is effective for actuating said disconnecting means at about said occurrence of said sharp rise.

58. The combination of claim 55, further including:
means for producing a second output signal which is delayed with respect to the occurrence of said sharp rise;
first means, coupled to said first output signal, for producing a first pulse signal; and
said disconnecting means being coupled to said first signal and being responsive thereto to disconnect said dimmer load from said second dimmer.

* * * * *

UNITED STATES PATENT AND TRADEMARK OFFICE
CERTIFICATE OF CORRECTION

PATENT NO. : 4,797,599

DATED : Jan. 10, 1989

INVENTOR(S) : Jonathan H. Ference, et al.

It is certified that error appears in the above-identified patent and that said Letters Patent is hereby corrected as shown below:

Correct the inventorship field on
the face of the patent by adding:
--Joel S. Spira, Coopersburg, Pa.--.

Signed and Sealed this

Ninth Day of May, 1989

Attest:

DONALD J. QUIGG

Attesting Officer

Commissioner of Patents and Trademarks

(12) EX PARTE REEXAMINATION CERTIFICATE (5859th)
United States Patent
Ference et al.

(10) Number: US 4,797,599 C1
(45) Certificate Issued: Aug. 21, 2007

(54) POWER CONTROL CIRCUIT WITH PHASE CONTROLLED SIGNAL INPUT

(75) Inventors: Jonathan H. Ference, Kintnersville, PA (US); Steven M. Blonstein, Allentown, PA (US); Michael J. Rowen, Emmaus, PA (US); Robert C. Newman, Jr., Emmaus, PA (US); Joel S. Spira, Coopersburg, PA (US)

(73) Assignee: Lutron Electronics Co., Inc., Coopersburg, PA (US)

Reexamination Request:
No. 90/006,876, Nov. 25, 2003
No. 90/007,166, Aug. 10, 2004

Reexamination Certificate for:
Patent No.: 4,797,599
Issued: Jan. 10, 1989
Appl. No.: 07/040,618
Filed: Apr. 21, 1987

Certificate of Correction issued May 9, 1989.

(51) Int. Cl.
*H05B 41/20* (2006.01)

(52) U.S. Cl. .................. 315/194; 315/199; 315/225; 315/226; 315/294; 315/299; 315/DIG. 4; 315/DIG. 7

(58) Field of Classification Search .................. 315/194, 315/199, 225, 244, 291, 292, 293, 294, 299, 315/288, 307, 311, 312, 318, 320, 226, 324, 315/DIG. 4, DIG. 7; 361/386, 388
See application file for complete search history.

(56) References Cited

U.S. PATENT DOCUMENTS

| | | | |
|---|---|---|---|
| 2,248,084 A | 7/1941 | Holcomb, Jr. | 315/319 |
| 2,806,197 A | 9/1957 | Rockafellow | 323/300 |
| 3,031,598 A | 4/1962 | Bell | 315/201 |
| 3,159,766 A | 12/1964 | Harpley | 315/195 |
| 3,167,683 A | 1/1965 | Harpley | 315/198 |
| 3,192,466 A | 6/1965 | Sylvan et al. | 323/326 |
| 3,193,728 A | 7/1965 | Skirpan | 315/251 |
| 3,243,653 A | 3/1966 | Locklin | 315/194 |
| 3,249,806 A | 5/1966 | Genuit | 315/194 |
| 3,249,807 A | 5/1966 | Nuckolls | 315/199 |

(Continued)

FOREIGN PATENT DOCUMENTS

| | | |
|---|---|---|
| CA | 1013814 | 7/1977 |
| DE | 2238065 A1 | 2/1974 |
| DE | 2426983 A1 | 4/1975 |
| DE | 2718460 A1 | 11/1978 |
| DE | 3447486 A1 | 7/1985 |

(Continued)

OTHER PUBLICATIONS

Transcript of Deposition of M. Moskowitz and Exhibits taken on Feb. 23, 2004 in the matter entitled *Electronics Inc. v. Genlyte Thomas Group LLC*, Civil Action No. 2:03 CV 2702 vols. I, II and III.

Transcript of Deposition of S. Weiner and Exhibits taken on Feb. 23, 2004 in the matter entitled *Lutron Electronics Inc. v. Genlyte Thomas Group LLC*, Civil Action No. 2:03 CV 2702.

(Continued)

*Primary Examiner*—Wilson Lee (57) ABSTRACT

One or more power dimmers have a preshaped phase controlled input signal connected to their control input. The preshaped phase controlled input signal is generated from the output of a master dimmer having conventional phase control circuits operated from a manual or other control. A relay having contacts in the output circuit of the power dimmers is opened in response to the reduction of the phase controlled input signal to a value less than a given value. In an alternative embodiment, the power dimmers are replaced by an interface circuit which produces a variable frequency, pulse width modulated or other signal.

U.S. PATENT DOCUMENTS

| | | | | |
|---|---|---|---|---|
| 3,284,667 A | * | 11/1966 | Harris et al. | 315/195 |
| 3,300,711 A | | 1/1967 | Duncan | 323/326 |
| 3,317,788 A | | 5/1967 | Locklin | 315/194 |
| 3,317,789 A | | 5/1967 | Nuckolls | 315/194 |
| 3,320,437 A | | 5/1967 | Myers | 327/187 |
| 3,323,014 A | | 5/1967 | West | 315/194 |
| 3,335,318 A | | 8/1967 | Yancey | 315/194 |
| 3,344,310 A | | 9/1967 | Nuckolls | 315/199 |
| 3,348,063 A | | 10/1967 | Bray | 327/460 |
| 3,351,810 A | | 11/1967 | Moerkens | 315/194 |
| 3,355,657 A | | 11/1967 | Biet et al. | 323/223 |
| 3,369,150 A | | 2/1968 | Malmin | 315/194 |
| 3,397,344 A | | 8/1968 | Skirpan | 315/194 |
| 3,419,753 A | | 12/1968 | Schultz et al. | 315/194 |
| 3,422,309 A | | 1/1969 | Spira et al. | 315/194 |
| 3,430,101 A | | 2/1969 | Biltz | 315/194 |
| 3,527,947 A | | 9/1970 | Weisglass et al. | 250/103 |
| 3,534,224 A | | 10/1970 | Skirpan et al. | 315/296 |
| 3,558,902 A | | 1/1971 | Casey | 307/3 |
| 3,588,598 A | | 6/1971 | Isaac | 315/199 |
| 3,596,171 A | * | 7/1971 | Hildebrand | 323/327 |
| 3,619,713 A | | 11/1971 | Biega et al. | 315/105 |
| 3,619,716 A | | 11/1971 | Spira et al. | 315/244 |
| 3,639,782 A | | 2/1972 | Lord | 327/461 |
| 3,684,919 A | | 8/1972 | Cramer | 315/194 |
| 3,691,404 A | | 9/1972 | Swygert | 327/423 |
| 3,691,406 A | | 9/1972 | Mize | 307/308 |
| 3,697,821 A | * | 10/1972 | Johnson | 361/205 |
| 3,707,682 A | * | 12/1972 | Harris | 323/327 |
| 3,715,623 A | | 2/1973 | Szabo | 315/194 |
| 3,723,887 A | | 3/1973 | Panico | 327/374 |
| 3,731,142 A | | 5/1973 | Spira et al. | 315/94 |
| 3,733,528 A | | 5/1973 | Gilbreath | 315/291 |
| 3,742,295 A | | 6/1973 | Irie | 315/194 |
| 3,746,923 A | | 7/1973 | Spira et al. | 315/291 |
| 3,749,976 A | | 7/1973 | Colyn | 315/241 R |
| 3,786,473 A | | 1/1974 | Trombley et al. | 340/825.52 |
| 3,789,211 A | | 1/1974 | Kramer | 362/231 |
| 3,816,794 A | | 6/1974 | Snyder | 315/194 |
| 3,816,797 A | | 6/1974 | Skirpan | 315/291 |
| 3,831,059 A | | 8/1974 | LoNigro | 315/320 |
| 3,835,349 A | | 9/1974 | Yancey | 315/194 |
| 3,845,350 A | | 10/1974 | Luursema et al. | 315/291 |
| 3,846,671 A | | 11/1974 | Johnson | 315/291 |
| 3,859,561 A | | 1/1975 | Gilbreath et al. | 315/293 |
| 3,863,102 A | | 1/1975 | Herzog | 315/105 |
| 3,863,104 A | | 1/1975 | Bolhuis | 315/154 |
| 3,867,641 A | | 2/1975 | Collins | 307/117 |
| 3,868,546 A | | 2/1975 | Gilbreath et al. | 315/293 |
| 3,878,431 A | | 4/1975 | Petrina | 315/195 |
| 3,894,265 A | | 7/1975 | Holmes et al. | 315/194 |
| 3,898,516 A | | 8/1975 | Nakasone | 315/194 |
| 3,902,080 A | | 8/1975 | St. Clair et al. | 327/452 |
| 3,919,596 A | | 11/1975 | Bellis | 315/294 |
| 3,935,505 A | | 1/1976 | Spiteri | 315/194 |
| 3,936,696 A | | 2/1976 | Gray | 315/210 |
| 3,953,763 A | | 4/1976 | Herrick | 315/262 |
| 3,964,023 A | | 6/1976 | Fauchez | 340/825.51 |
| 4,001,637 A | * | 1/1977 | Gray | 315/205 |
| 4,008,416 A | | 2/1977 | Nakasone | 315/194 |
| 4,011,482 A | | 3/1977 | Seib | 315/361 |
| 4,049,976 A | | 9/1977 | Pascente | 327/461 |
| 4,057,751 A | | 11/1977 | Bonsignore et al. | 315/316 |
| 4,087,702 A | | 5/1978 | Kirby et al. | 327/459 |
| 4,090,107 A | | 5/1978 | Seib | 315/156 |
| 4,096,414 A | | 6/1978 | Howell | 315/291 |
| 4,144,478 A | * | 3/1979 | Nuver | 315/291 |
| 4,152,607 A | | 5/1979 | Nakasone | 327/170 |
| 4,152,608 A | | 5/1979 | Nakasone et al. | 327/402 |
| 4,155,015 A | | 5/1979 | Nakasone et al. | 327/476 |
| 4,155,505 A | | 5/1979 | Young | 237/2 B |
| 4,197,485 A | | 4/1980 | Nuver | 315/291 |
| 4,206,443 A | | 6/1980 | Britton | 340/343 |
| 4,207,497 A | | 6/1980 | Capewell et al. | 315/96 |
| 4,207,498 A | | 6/1980 | Spira et al. | 315/DIG. 4 |
| 4,210,846 A | | 7/1980 | Capewell et al. | 315/121 |
| 4,215,277 A | | 7/1980 | Weiner et al. | 307/41 |
| 4,221,978 A | | 9/1980 | Smith et al. | 327/402 |
| 4,225,808 A | | 9/1980 | Saraceni | 315/194 |
| 4,241,295 A | | 12/1980 | Williams, Jr. | 315/294 |
| 4,246,494 A | | 1/1981 | Foreman et al. | 307/116 |
| 4,250,432 A | | 2/1981 | Kohler | 315/291 |
| 4,259,619 A | | 3/1981 | Wall | 315/361 |
| 4,274,033 A | | 6/1981 | Nuckolls | 315/209 R |
| 4,276,486 A | | 6/1981 | Ahuja et al. | 327/459 |
| 4,284,972 A | | 8/1981 | Chiu et al. | 340/457.4 |
| 4,287,468 A | | 9/1981 | Sherman | 323/322 |
| 4,331,914 A | | 5/1982 | Huber | 323/324 |
| 4,334,171 A | | 6/1982 | Parman et al. | 315/DIG. 4 |
| 4,350,935 A | | 9/1982 | Spira et al. | 315/291 |
| 4,350,944 A | | 9/1982 | Strauch, Jr. | 318/779 |
| 4,358,715 A | | 11/1982 | Dinges et al. | 315/292 |
| 4,358,716 A | | 11/1982 | Cordes et al. | 315/306 |
| 4,360,737 A | | 11/1982 | Leopold | 307/116 |
| 4,360,739 A | | 11/1982 | Goldstein | 307/132 E |
| 4,367,510 A | | 1/1983 | Watanabe | 361/160 |
| 4,370,600 A | * | 1/1983 | Zansky | 315/244 |
| 4,377,739 A | | 3/1983 | Eckert, Jr. | 219/497 |
| 4,379,254 A | | 4/1983 | Hurban | 315/291 |
| 4,388,567 A | | 6/1983 | Yamazaki et al. | 315/291 |
| 4,392,086 A | * | 7/1983 | Ide et al. | 315/174 |
| 4,392,087 A | | 7/1983 | Zansky | 315/219 |
| 4,395,660 A | | 7/1983 | Waszkiewicz | 315/291 |
| 4,396,869 A | | 8/1983 | Rosenbaum et al. | 315/194 |
| 4,410,838 A | | 10/1983 | Hirschfeld et al. | 315/320 |
| 4,410,839 A | | 10/1983 | Dobkin | 315/320 |
| 4,413,211 A | | 11/1983 | Fowler | 318/257 |
| 4,425,532 A | | 1/1984 | Sinkauz | 315/360 |
| 4,430,576 A | | 2/1984 | Fowler | 307/38 |
| 4,439,688 A | | 3/1984 | Schornack | 307/115 |
| 4,465,965 A | | 8/1984 | Fowler | 323/239 |
| 4,478,468 A | | 10/1984 | Schoen et al. | 315/DIG. 4 |
| 4,482,844 A | | 11/1984 | Schweer et al. | 315/194 |
| 4,508,997 A | | 4/1985 | Woodnutt | 315/360 |
| 4,520,295 A | | 5/1985 | Bolhuis | 315/DIG. 4 |
| 4,520,306 A | | 5/1985 | Kirby | 323/324 |
| 4,525,634 A | | 6/1985 | Southard | 307/115 |
| 4,527,099 A | | 7/1985 | Capewell et al. | 315/291 |
| 4,528,494 A | | 7/1985 | Bloomer | 323/237 |
| 4,529,888 A | | 7/1985 | Fleischer | 327/458 |
| 4,540,917 A | * | 9/1985 | Luchaco et al. | 315/291 |
| 4,558,262 A | | 12/1985 | Longenderfer et al. | 315/307 |
| 4,563,592 A | | 1/1986 | Yuhasz et al. | 307/115 |
| 4,575,660 A | | 3/1986 | Zaharchuk et al. | 315/295 |
| 4,591,765 A | | 5/1986 | Beck | 315/361 |
| 4,604,552 A | | 8/1986 | Alley et al. | 315/176 |
| 4,633,161 A | | 12/1986 | Callahan et al. | 323/242 |
| 4,651,060 A | | 3/1987 | Clark | 315/199 |
| 4,663,570 A | | 5/1987 | Luchaco et al. | 315/219 |
| 4,682,083 A | * | 7/1987 | Alley | 315/307 |
| 4,689,547 A | | 8/1987 | Rowen et al. | 323/239 |
| 4,719,446 A | * | 1/1988 | Hart | 340/310.11 |
| 4,733,138 A | | 3/1988 | Pearlman et al. | 315/307 |
| 4,792,729 A | | 12/1988 | Peters | 315/200 R |
| 4,792,731 A | | 12/1988 | Pearlman et al. | 315/316 |
| 4,797,599 A | | 1/1989 | Ference et al. | 315/194 |
| 4,797,876 A | | 1/1989 | Ratcliff | 370/261 |
| 4,823,069 A | | 4/1989 | Callahan et al. | 323/235 |
| 4,876,498 A | | 10/1989 | Luchaco et al. | 323/300 |

FOREIGN PATENT DOCUMENTS

| | | | |
|---|---|---|---|
| DE | 3524681 | A1 | 1/1987 |
| DE | 2517211 | C2 | 2/1987 |
| DE | 3228020 | C2 | 4/1987 |
| DE | 3708024 | A1 | 9/1987 |
| DE | 3705531 | A1 | 11/1987 |
| DE | 3524681 | C2 | 7/1988 |
| DE | 2952584 | C2 | 8/1988 |
| DE | 3315793 | C2 | 1/1992 |
| DE | 3437538 | C2 | 7/1994 |
| DE | 3705531 | C2 | 1/1998 |
| EP | 0046395 | A1 | 2/1982 |
| EP | 0293569 | A2 | 7/1988 |
| EP | 0427709 | B1 | 6/1995 |
| GB | 1092509 | A | 11/1967 |
| GB | 1188318 | A | 4/1970 |
| GB | 2027294 | A | 2/1980 |
| JP | 49-106276 | | 10/1974 |
| JP | A S49-106276 | | 10/1974 |
| JP | A S49-131094 | | 12/1974 |
| JP | 49-131094 | | 12/1974 |
| JP | 50-33220 | | 3/1975 |
| JP | B S50-33220 | | 3/1975 |
| JP | A 57-76799 | | 5/1982 |
| JP | A S58-14223 | | 1/1983 |
| JP | 58-14223 | | 1/1983 |
| JP | 58-014223 | A2 | 1/1983 |
| JP | 58-54411 | | 3/1983 |
| JP | 58-054411 | A2 | 3/1983 |
| JP | 58-131690 | | 8/1983 |
| JP | B S58-192297 | | 11/1983 |
| JP | 58-192297 | | 11/1983 |
| JP | 59-143128 | | 8/1984 |
| JP | 59-180708 | A2 | 10/1984 |
| JP | A S60-183964 | | 9/1985 |
| JP | 60-183964 | A2 | 9/1985 |
| JP | 61-53900 | | 3/1986 |
| JP | 61-78095 | | 4/1986 |
| JP | 61-109119 | A | 5/1986 |
| JP | 62-24598 | | 2/1987 |
| JP | A S62-24598 | | 2/1987 |
| JP | 62-34800 | | 2/1987 |
| JP | 040618 | | 1/1992 |

OTHER PUBLICATIONS

Transcript of Deposition of Jonathan H. Ference and Exhibits taken on Feb. 17, 2004 in the matter entitled *Lutron Electronics Inc.* v. *Genlyte Thomas Group LLC*, Civil Action No. 2:03 CV 2702.

Chapt. "Ansteuergeräte" From Book: Vem–Handbuch Leistungselektronik/Zentrum für Forschung and Technologie des veb Elekroprojekt und Anlagenbau Berlin (Editor); Laype, Rudolf (Editorial Office); Conrad, Harry . . . –Berlin: Verlag Technik, 4th Revised Ed., pp. 142–164, 1986.

Chapt. "Steuerkreis" From Book: Vem–Handbuch Leistungselektronik/Zentrum für Forschung and Technologie des veb Elekroprojekt und Anlagenbau Berlin (Editor); Laype, Rudolf (Editorial Office); Conrad, Harry . . . –Berlin: Verlag Technik, 4th Revised Ed., pp. 442–451, 1986.

Chapt. "Wechselromsteller für Beleuchtungsan, Widerstadsöfen und Schweibgeräte" From Book: Vem–Handbuch Leistungselektronik/Zentrum Für Forschung und Technologie des veb Elekroprojekt und Anlagenbau Berlin (Editor); Lappe, Rudolf (Editorial Office); Conrad, Harry . . . —Berlin: Verlag Technik, 4th Revised Ed., pp. 418–423, 1986.

Chapt. "Thyristorbausteine und Baugruppen für Industrielle Anwendungen" From Book: ABC Von Thyristor und Triac/Pilz Günter.–Berlin: Militärverlag der DDR, 1986, ISBN 3–327–00108–1. p. 123–145.

Chapt. "Zündschaltungen" From Book ABC Von Thyristor und Triac/Pilz, Günter.–Berlin: Militärverlag der DDR, 1986, ISBN 3–327–00108–1. p. 146–157.

"Chapt. Belevchtungsregelung und–Steuerung" From Book: ABC Von Thyristor Und Triac/Pilz, Günter.–Berlin: Militärverlag der DDR, 1986, ISBN 3–327–00108–1. p. 176–184.

Chapt. "Leistungssteuerung und–Regelung" From Book: Thyristoren Und Thyristorschaltungen/Hahn, Hans.–Heidelberg: Hüthig Verlag, 2nd Revised and Corrected Edition, 1973, ISBN 3–7785–0270–0, p. 90–106.

Article "Sitor–Steuersatz füNetzgeführte Stromrichter" From Magazine: Linden, Wilhelm; Schäfer, Hans–Dieter; Thumm, Hans.–Siemens–Zeit Zeitschrift 51 (1977) 4, p. 315–318.

Article "Vergleich Verschiedener Zündsteuerverfahren für Netzgeführte Stromrichter" From Magazine: Maurer, Franz. ETZ–A 95 (1974) 1, p. 50–55.

Article "Impulssteuerteil für Thyristoren und Triacs mit Integrierten Schajkreisen" From Magazine: Kühne, Harro–Radio Fernsehen Elektronik 20 (1971) 22 p. 740–2.

Solid–State Relay Handbook with Applications; Sams & Co.

*SCR Manual Including Triacs and Other Thyristors,* 4th ed., New York, General Electric Co.

*SCR Manual Including Triacs and Other Thyristors,* 5th ed., New York, General Electric Co.

*SCR Manual Including Triacs and Other Thyristors,* 6th ed., New York, General Electric Co.

\* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–58 is confirmed.

* * * * *